S. C. CARTER.
TRANSMISSION MECHANISM.
APPLICATION FILED MAY 19, 1910.

988,973.

Patented Apr. 11, 1911.
5 SHEETS—SHEET 2.

S. C. CARTER.
TRANSMISSION MECHANISM.
APPLICATION FILED MAY 16, 1910.

988,973.

Patented Apr. 11, 1911.
5 SHEETS—SHEET 5.

Witnesses:
H. N. Kirkby
L. Belle Rice

Inventor:
Samuel C. Carter
by James R. Townsend
his atty.

THE NORRIS PETERS CO., WASHINGTON, D. C.

UNITED STATES PATENT OFFICE.

SAMUEL C. CARTER, OF LOS ANGELES, CALIFORNIA.

TRANSMISSION MECHANISM.

988,973.

Specification of Letters Patent. Patented Apr. 11, 1911.

Application filed May 19, 1910. Serial No. 562,316.

*To all whom it may concern:*

Be it known that I, SAMUEL C. CARTER, a citizen of the United States, residing at Los Angeles, in the county of Los Angeles and State of California, have invented a new and useful Transmission Mechanism, of which the following is a specification.

Objects of this invention are: to provide for automobiles, motor cars and the like, a direct drive transmission mechanism which has improved shifting mechanism to shift into and out of gear; means for actuating the said shifting mechanism to drive backward simultaneously with the throwing in of the low speed; improved means for changing to and from high, intermediate and low speed with greater ease and convenience than heretofore; said last-named means being inclosed in a dirt and dust proof case, the operating parts of which are not liable to get out of order or to readily break, and said means also having superior features as to simplicity, lightness and strength.

Another object is to provide an automobile or the like having differential driving wheels with a solid or undivided shaft or axle at the middle portion thereof, thereby avoiding the usual weakening of the rear shaft or axle caused by dividing the same in the center for differential motion, and at the same time to bring the differential means within the transmission case, thus to bring the parts into closer relation to one another.

The transmission mechanism may be mounted directly upon the rear axle of the vehicle or hung in a frame and thence the power is transmitted to the rear driving wheels, the latter method being shown and described in this application.

An object of this invention is to construct an independent drive for each rear wheel which will be practically noiseless and will apply the power to the wheels individually so as to drive each one forward independently of the other and to accomplish this by compact means and a minimum number of clutches or ratchet devices and to provide means whereby the centrifugal force exerted on the ratchet ball will insure operation at low speed. Also to provide improved and more compact means for shifting the gear.

An object is to so construct the machine as to give it maximum life of operation, and to reduce to a minimum the number of gears in variable speed transmission mechanism.

The accompanying drawings illustrate the invention.

Fig. 4 is a fragmental horizontal axial section on line $x^4$—$x^4$, Figs. 9, 10, 11 and 16, of the transmission mechanism showing the direction mechanism in position to propel the car forward, and the driving mechanism out of gear. Fig. 5 is a view analogous to Fig. 4, except that a part of the section is taken on line $x^5$—$x^4$, Fig. 16, and the parts are in position to propel the car rearward. Figs. $5^a$ and $5^b$ are detached sectional views of the clutch collars. Fig. 6 is a fragmental section on line $x^6$—$x^6$, Figs. 2, 9 and 10. Operating parts are in position for forward drive. Fig. 7 is a view analogous to Fig. 6, showing the parts shifted into position for rearward drive. Fig. 8 is a sectional detail on line $x^8$—$x^8$, Figs. 4 and 5.

In Fig. 25 the low speed pinion and its key is shown; in Fig. 26 the second and high speed pinions with the key of the second speed pinion are shown and in Fig. 27 the high speed and second speed pinions are shown with the key for the high speed pinion.

1 is a driving shaft, 2 an axially shiftable driven shaft and 3, 3, the power-transmitting shafts of the variable speed transmission mechanism 4.

5, 6 and 7 designate means for connecting the power transmission shafts with the driving ground wheels 8; 7 representing sprocket wheels fixed to said ground wheels 8; 6 representing sprocket chains connecting said ground wheels 8 with sprocket wheels 5 that are fixed to the power transmission shafts 3, 3. The parts 5, 6, 7 and 8 are duplicated on opposite sides of the car.

The driving shaft 1 is connected with the engine, not shown, of the motor car and together with the variable speed transmission mechanism 4 is mounted on the frame $e$ of the car-body. The power transmitting shafts 3, 3 are joined to internally notched ratchet collars 9, 9, the ends of which are internally screw-threaded and are provided with slots 10 into which extend tongues 11 of flanges 12; that are integral with the shafts 3, 3, respectively, and are held in place in the collar by lock-nuts 13 screwed into the collar over the flanges.

14 designates pocketed drums fixed to the outer ends of the axially shiftable driven shaft 2, and provided with a plurality of pockets 15 in which are provided means in the form of balls 16, that under pressure of springs 17 engage the internally notched ratchet collars 9, 9. Said collars have intercommunicating forwardly and rearwardly directed internal driving notches 18 and 19 arranged in parallel planes that are normal to the axis of rotation. Said notches deepen outward gradually and terminate abruptly at the outer ends so that when the sprocket 5 and shaft 3 rotate in one direction relative to the shaft 2 any ball that enters a notch will ride on an incline, thus allowing free rotation of shaft 3, and consequently of the sprocket 5 and wheel 8; and when the shaft 2 rotates to overtake the shaft 3 the ball will engage between the abrupt end of the notch and the wall of the pocket, thus to drive the power transmission shaft 3, sprocket 5, and wheel 8 so long as the tendency of the driving shaft 2 to rotate the drive wheel 8 is greater than the tendency of the transmission shaft 3 to rotate responsive to the travel of wheel 8 on the ground.

Means are provided for shifting the driven shaft 2 axially to bring the balls 16 of the drums 14 into clutching position relative to the notches of one or the other plane, to drive the power transmitting shafts 3, 3 in one or the other direction to propel the rear wheels 8 and the car forward or backward as may be required.

Figures 4, 5, 5A, 5B, 6, 7, 8:
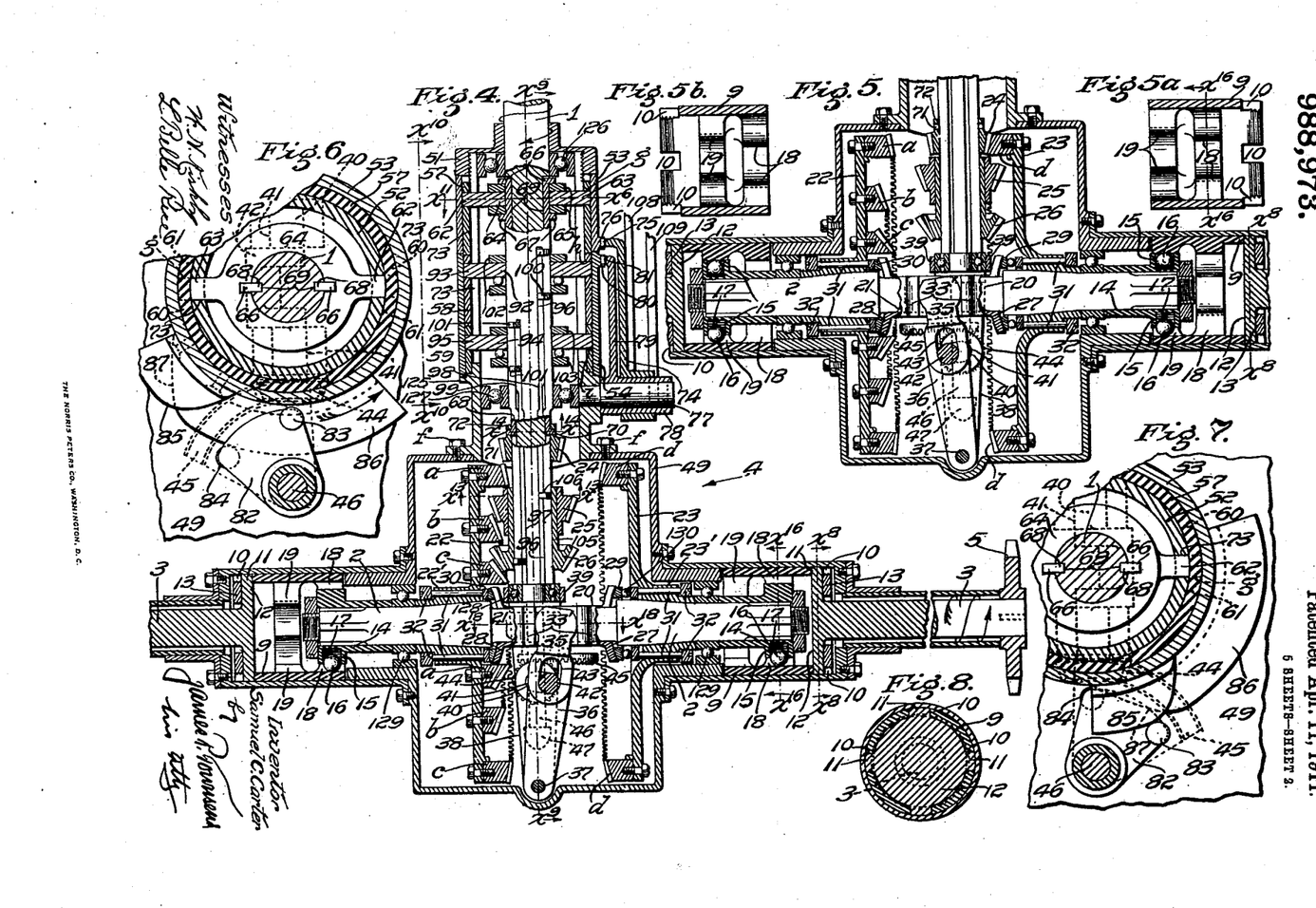
Figures 9, 10, 11, 12, 13, 14, 15, 16, 17:
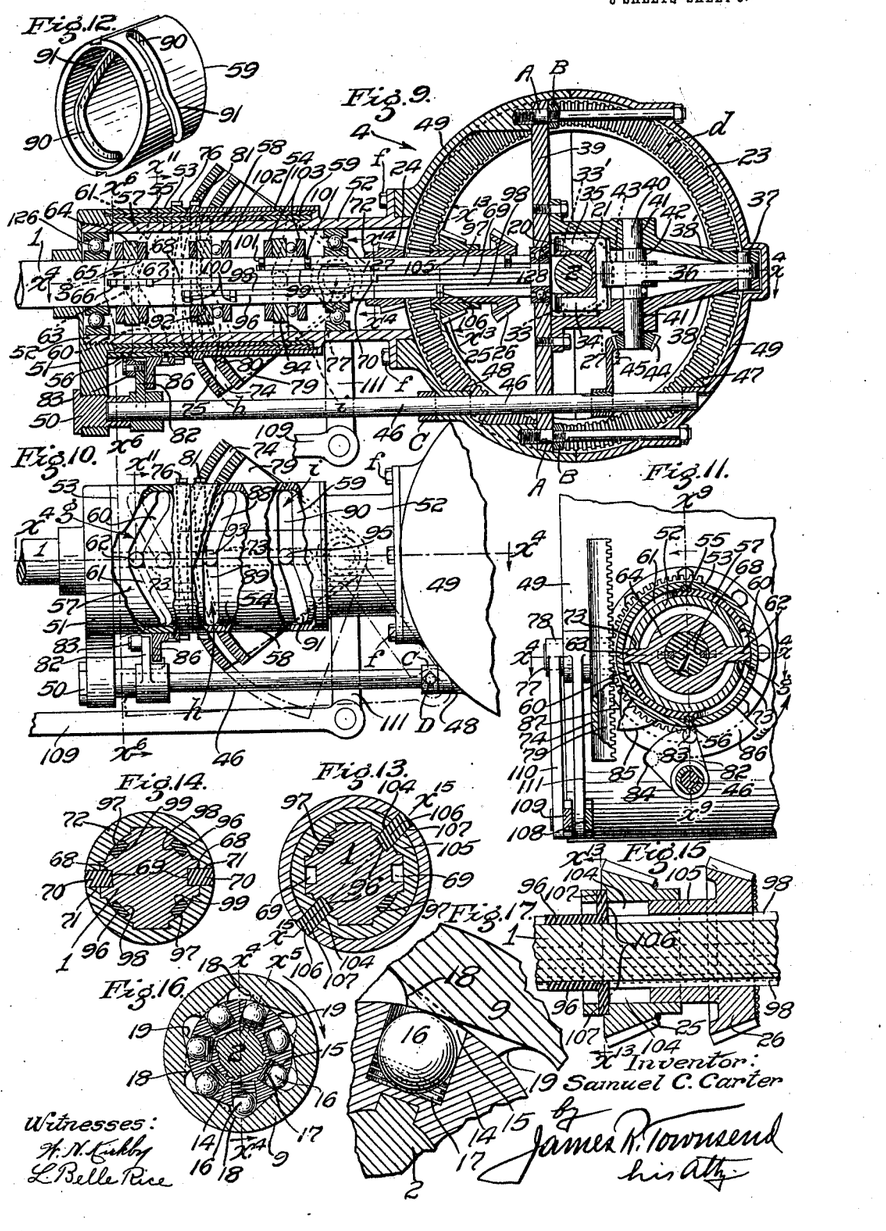
Fig. 9 is a transverse sectional elevation on line $x^9$—$x^9$, Figs. 1, 4 and 11. Parts are in the same position as in Fig. 4.
Fig. 10 is a fragmental elevation viewed from line $x^{10}$—$x^{10}$, Fig. 4, looking in the direction of the arrows. The housing is broken to expose the speed-shifting mechanism.
Fig. 11 is a fragmental section on plane indicated by $x^{11}$—$x^6$, Figs. 4, 9 and 10.
Fig. 12 is a detailed detached perspective view of one of the shifting bushings.
Fig. 13 is a section on line $x^{13}$—$x^{13}$, Figs. 4, 9 and 15.
Fig. 14 is a section on line $x^{14}$—$x^{14}$, Figs. 4 and 9.
Fig. 15 is a sectional detail on line indicated by $x^{15}$—$x^{15}$, Fig. 13.
Fig. 16 is a sectional detail on line $x^{16}$—$x^{16}$, Fig. 4.
Fig. 17 is an enlarged fragmental detail of parts shown in Fig. 16.
Figures 18, 19, 20, 21, 22, 23, 24:
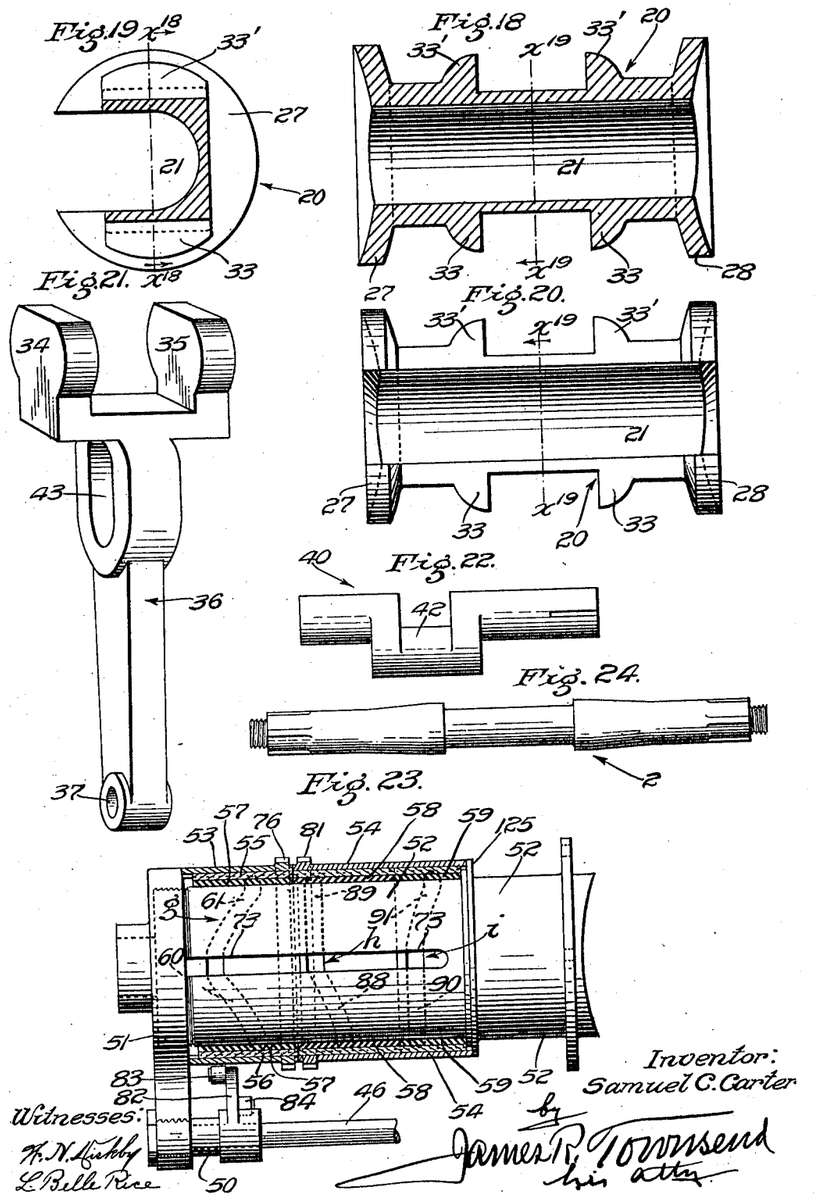
Fig. 18 is an axial section of the driven shaft sleeve on line $x^{18}$, Figs. 4 and 19, looking in the direction of the arrow.
Fig. 19 is a transverse section of said sleeve on line $x^{19}$, Figs. 18 and 20.
Fig. 20 is an elevation of the sleeve from the left of Fig. 19.
Fig. 21 is a perspective view of the operating arm which engages the sleeve shown in Fig. 20.
Fig. 22 is a view of the crank shaft detached from said arm.
Fig. 23 is a fragmental detail of the gear-inclosing housing, with the operating and shifting cylinders shown in section thereon.
Fig. 24 is a view of the driven shaft detached.
Figure 25:
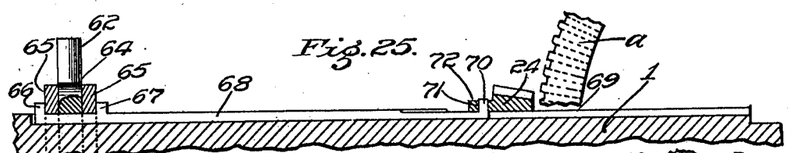
Figs. 25, 26 and 27 show fragments of the shaft with pinions and the shifting keys and other elements thereon whereby the low speed, second speed and high speed pinions are shifted into and out of position to mesh with the low speed, second speed and high speed gears on the transmission disks. Said fragments of the shaft are rotatively displaced relative to each other so as to show the three shifting keys which respectively shift the low speed, second speed and high speed pinions. Fragments of the forward driving disk gears are also indicated. The pinions are all out of mesh.
Figure 26:
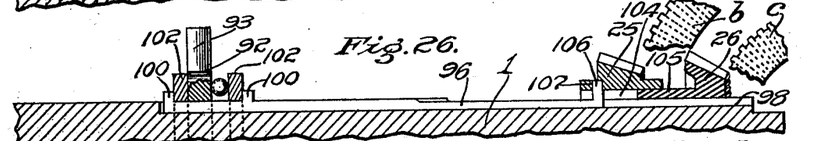
Figure 27:
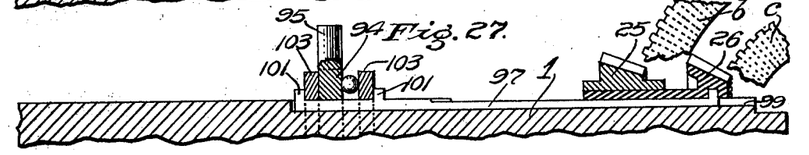
Figure 28:
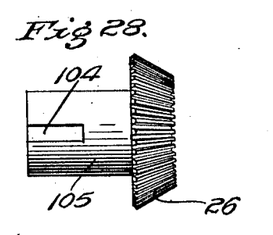
Fig. 28 is a view of the high speed pinion detached.
Figure 29:
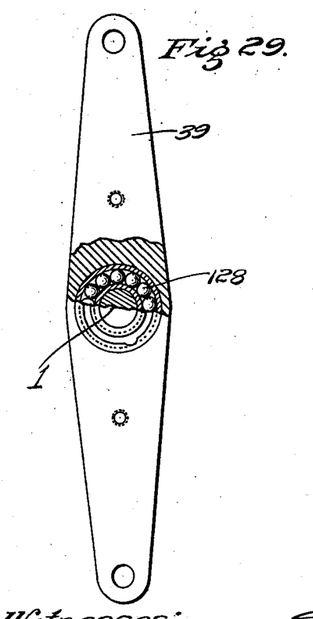
Fig. 29 is a view of the cross bar which supports the rear end of the driving shaft. The end of said shaft with the anti-friction bearing therefor is also shown and the cross bar is broken away to expose the interior construction of said bearing.
Figure 30:
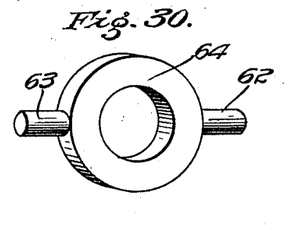
Fig. 30 is a view of one of the key-shifting collars.

By reference to Figs. 4, 5, 16 and 17 it may be seen that when the shaft 2 is shifted to the right, as in Fig. 4, a ball 16 will engage the abrupt end of a ratchet notch 18 whenever the tendency of the driven shaft 2 to rotate in the direction of the curved arrow in Figs. 4 and 16, is greater than that of the shaft 3 to rotate in such direction and that consequently the sprocket wheel 5 and its chain 6 will drive the rear ground wheel 8 to propel the car forward; and that in case the wheels 8 and consequently the shafts 3 tend to run faster than the shaft 2, the balls will ride on the sloping floors of the notches, and allow free rotation of shaft 3 without affecting shaft 2, thus allowing for differences of speed between the wheels 8 in turning a corner while the car is running forward. By shifting the shaft 2 to the left as in Fig. 5, the balls are brought into position to engage the notches 19 to drive the wheels 8 backward, and to allow either or both of them to rotate backward at a greater speed than that of the driven shaft 2.

The means for shifting the driven shaft 2 comprises an open-sided sleeve 20 having a recess 21 in which the shaft rotates freely and which is mounted between two variable-speed transmitting gear disks 22, 23, that have hubs 22′, 23′ by which they are fixed to the driven shaft 2 to transmit motion to said shaft from the gar wheels 24, 25 and 26 of the driving shaft 1. The sleeve 20 is provided with slotted annular shoulders 27 and 28 that are adapted to act upon antifriction thrust bearings 29 and 30 which are held in place by adjusting-pins 31 carried by and extending through the disks 22 and 23 to shift the disks and the driven shaft 2 transversely of the driving shaft 1 and the gear wheels 24, 25 and 26, thus to bring the required one of the gear disks 22, 23, into position to receive power from a pinion for forward or rearward propulsion. The annular thrust bearings 29 and 30 may be adjusted toward the sleeve 20 to take up wear by turning the adjusting nuts 32 that are screwed on the hubs 22', 23', and that contact with the outside end of the pins 31 which are mounted in the disks 22 and 23, and which pins in turn engage the annular thrust bearings 29, 30. Lugs 33 and 33' integral with the sleeve 20 and on opposite sides of the slot thereof, accommodate the tines 34 and 35 of a forked arm 36 that is pivoted at 37 to and between two stationary standards 38 and 38' which are mounted upon the stationary crosspiece 39 and are thereby fixed to the gear case 49, to which the crosspiece is fixed by the case studs A and nuts B. Said forked arm 36 is operated by the direction controlling crank shaft 40 which is mounted in bearings 41 in said standards with its crank 42 in a slot 43 in the arm 36 to swing the arm 36 to move the sleeve 20 endwise to simultaneously shift the disks 22, 23, the driven shaft 2 and the drums 14 in a direction normal to the axis of the driving shaft 1, and to bring the balls 16 of the drums 14 from one to the other set of notches 18 and 19 of the collars 9 for driving forward and backward.

The forward drive disk 22 is provided with three bevel gears $a$, $b$, $c$, and the rear drive disk 23 is provided with one bevel gear $d$.

The parts are so arranged that when the shaft 2 and disks 22, 23, are in position to allow engagement of the bevel gears $a$, $b$, $c$, with the driving pinions 24, 25, 26, as shown in Fig. 4, the balls 16 are in position to engage the forward drive notches 18; and when the shaft 2 and disks 22, 23, are shifted to allow engagement of the annular toothed face $d$ with the gear wheel 24, as shown in Fig. 5, the balls 16 are brought into position to engage the rearward drive notches 19.

Directly under the standard 38 (see Fig. 9) there is secured upon the lower extremity of the crank shaft 40 a small bevel gear 44 which meshes with a bevel toothed segment 45 mounted upon a rock shaft 46, and in a bearing cap 50 which is screwed into the cap 51 of the cylindrical housing 52 that is fixed to the gear case 49 by a bolt $f$ and forms a support for the end of said rock shaft 46 which is held against endwise movement by a collar C and set screw D. Journaled on the housing 52 are two pinion shifting sleeves 53, 54, inside of which are fixed by means of keys 55, 56, the low speed shift bushing 57 in the sleeve 53, and the intermediate and high speed shift bushings 58 and 59 in the sleeve 54. The bushing 57 is practically a part of the sleeve 53 and the bushings 58 and 59 are practically parts of the sleeve 54; said bushings being made independently of the sleeves and then keyed thereto for easy construction.

In opposite sides of, and extending about half way around, the low speed shift bushing 57, are cut two V-shaped slots $g$ each having two legs 60, 61, and spreading toward the shaft 2. Working in the slots $g$ are two shift pins 62, 63, that are integral with and project outward from a collar 64 which is journaled on the driving shaft 1 inside the low speed shift bushing 57 between two thrust bearings 65, which are mounted on the driving shaft 1 to slide therealong, and are respectively engaged by lugs 66 and 67 projecting from keys 68 that slide in key-ways 69 along the shaft 1 to shift the low speed pinion 24 which is engaged by pinion engaging lugs 70 of the keys 68 that extend from the key-ways 69 into recesses 71 of the hub 72 of said pinion 24 to slide the pinion along the driving shaft.

The housing 52 is provided on opposite sides with straight longitudinal slots 73 extending from the forward end nearly to the rear end of the housing, and through which the shift pins 62 and 63 extend to be engaged by the V-shaped slots $g$ so that when the sleeve 53 is rotated the shift pins will be moved by the slots $g$ along the slots 73. The collar 64 is in normal inoperative position when the shift pins 62 and 63 are in the apexes between the legs 60, 61, of the slots $g$; and when the sleeve 53 is rotated in either direction, the slots $g$ move the shift pins 62, 63, of the collar 64 in one direction thus moving the thrust-bearing 65 along the shaft 1 and thereby sliding the key 68 and the low speed pinion 24 toward the shaft 2 and throwing said low speed pinion into position to engage either of the variable speed disks 22 or 23.

The low speed segment 74 having teeth 75 engaging teeth 76 upon the sleeve 53 to rotate said sleeve and its slotted bushing 57, is journaled upon a stub shaft 77 which is fixed to the housing 52 and upon which is also journaled the hub 78 of the intermediate and high speed segment 79 that has teeth 80 engaging teeth 81 upon the pinion shifting sleeve 54 to rotate said sleeve and the bushings 58, 59. For compactness and convenience of construction the segment 74 is indirectly journaled on the stub shaft, the hub 78 being elongated to carry said segment 74. These segments may be operated to rotate the shifting sleeves 53, 54, by various means. The means shown in the drawings for operating such segments are described later.

Means are provided whereby, when the transmitting disk 22 is in forward position, any one of the pinions 24, 25, 26, may be moved into and out of mesh with its respective bevel gear $a$, $b$, or $c$, without shifting the disk 22, and means are also provided whereby the operation of reversing the car will shift the disk 22 out of driving gear engaging position and will move the low speed gear 24 and the reversing disk 23 simultaneously to engagement with each other, thus enabling the pinion and gear to come into mesh without shock and jar, and with one operation of a single lever. For this purpose, an arm 82 is fixed upon the rock-shaft 46 and is provided with two rollers 83, 84, spaced apart, the roller 83 being mounted upon one side at one edge of the arm 82 and the roller 84 being mounted upon the other side at the other edge of said arm 82. Said rollers are arranged to be moved respectively by the short and long cams 85 and 86, that are mounted upon and turn with the sleeve 53. The arc of the long cam 86 corresponds to the arc embraced by any of the slots $g$ and said cam is provided with a receding or descending portion 87 that is alined, longitudinally of the driving shaft 1, with the cam 85 so that when the roller 83 is moved by the cam 85 the roller 84 will be held against the part 87 of the cam 86, thus to operate the rock-shaft 46 in both directions.

When the low speed shifting sleeve 53 is rotated by segment 74 in the direction of the curved arrows in Figs. 6, 9, 10 and 11, the cam 85 engages the roller 83 and swings the arm 82 to the position shown in Fig. 7, thus rotating the rock-shaft 46 and swinging the segment 45 to operate the crank-gear 44, and the crank 42, which swings the operating arm 36 that shifts the sleeve 20 and consequently the gear disks 22, 23, and also the driven shaft 2, clutch drums 14, and balls 16. As this is accomplished through contact of the cam 85 with the roller 83 while the roller 84 is in contact with and rides upon the descending portion 87 of the cam 86 the operation of rotating the shaft 46 is smooth and without jar.

Upon the same rotation of the shifting sleeve 53 just described, the shift pins 62, 63, are acted on by the legs 61 of the shifting slot $g$, thereby moving the collar 64, the key 68 and the low speed gear 24 along the shaft 1 to cause the gear to mesh with the reverse drive disk 23. Upon the opposite rotation of said sleeve 53, the cam 85 leaves the roller 83, and the cam 86 actuates roller 84, thereby gradually rocking the rock-shaft 46 back to its former position and again shifting the forward drive disk 22 into position to engage with any of the forward drive pinions 24, 25, 26. Upon this same opposite rotation, the shift pins 62, 63, are forced by the slot legs 61 back into the apex of slots $g$, thereby withdrawing the low speed pinion 24 from meshing position. When the tongues are in the apexes of said slots $g$ and the cam 86 engages the roller 84, and the low speed driving pinion 24 is out of engaging position, the forward drive disk 22 is in meshing position. Upon still further opposite rotation of the shifting sleeve 53 and its cams, the roller 84 rides around upon the periphery of the cam 86, thus holding the forward drive disk 22 in meshing position. The legs 60 of the slots $g$ move the shift pins, the collar and the key 68, to move the low speed pinion 24 along the driving shaft 1 into meshing position as before. During this further rotation of the shifting sleeve 53 the forward drive disk 22 is held stationary in the meshing position by operation of the rock shaft 46 by the cam 86 acting on the roller 84.

The slots $h$ and $i$ of the bushings 58 and 59 differ from the slot $g$ in that only one of the legs of each of the slots $h$ and $i$, is oblique, and the other leg lies in a plane that is normal to the axis of the shaft 1.

The arc of the oblique leg 88 of the slot $h$ is equal in length to the straight leg 89 thereof and is of less obliquity than the oblique legs of the slot $g$. The oblique leg 91 of the slot $i$ is of still less obliquity and said slots $h$, $i$, are reversely arranged relative to each other so that when the shifting sleeve 54 is rotated in one direction the oblique leg 88 of the slot $h$ will act upon the shifting pin 93 to shift the collar 92, and the leg 90 of the slot $i$ will remain neutral with regard to the shifting pin 95 while on the reverse movement the leg 91 of slot $i$ will shift the pin 95 while the leg 89 remains neutral with regard to the pin 93.

Connection is made between the pinions 25, 26, and the shifting collars 92 and 94 respectively by keys 96 and 97 sliding in key-ways 98 and 99 and provided with lugs 100 and 101 that are engaged by anti-friction thrust collars 102 and 103 which are slidable on and rotatable with the driving shaft 1 and which operate the shifting collars 92 and 94, respectively.

The keys 97 are connected to the high speed pinion 26 in the same manner as the keys 68 are connected to the low speed pinion 24 while slots 104 are provided in the elongate hub 105 of the high speed pinion 26 to allow the lugs 106 of second speed keys 96, to extend through and move along said hub while engaging the recess 107 in second speed pinion 25 to slide said pinion upon said hub. The segments 74 and 79 which operate the pinions 24, 25 and 26, advancing them to and from engaging position with the driven disks 22 and 23 upon the driving shaft 1 by the above described means, may be operated by various means.

Figures 1, 2, 3:
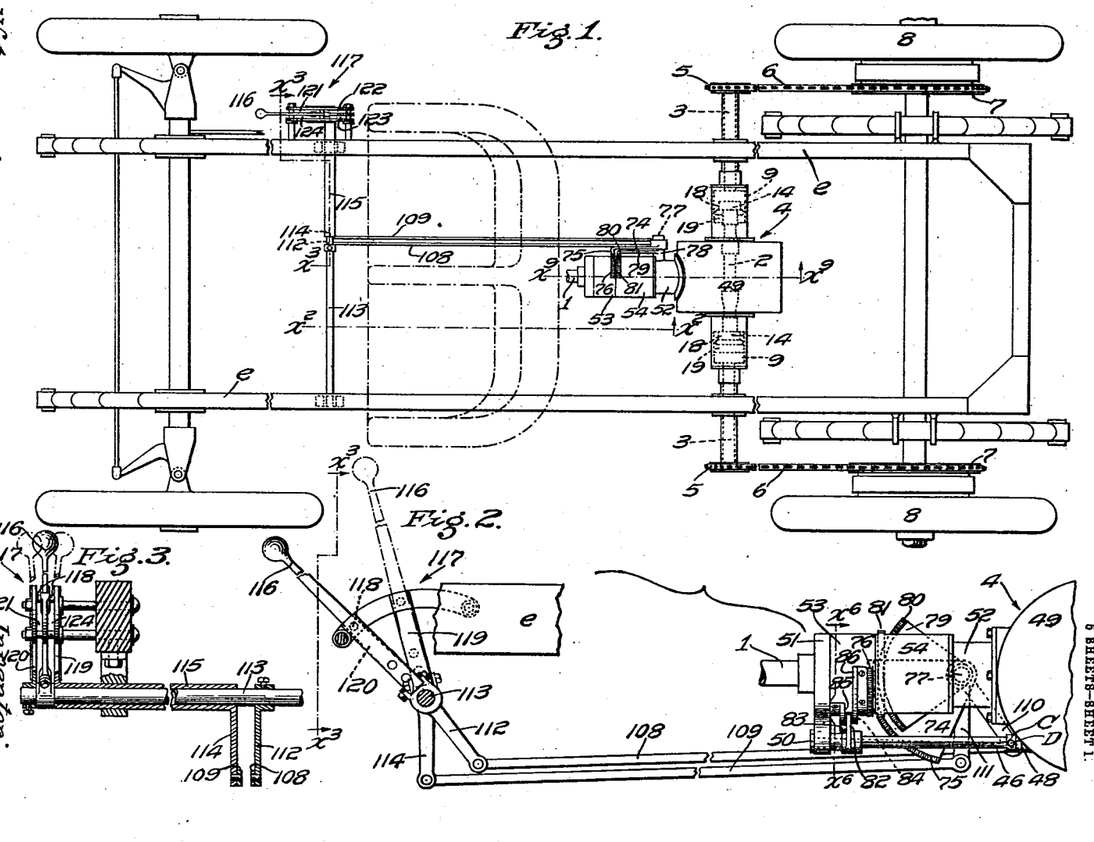
Figure 1 is a fragmental plan of a device embodying the invention as applied in an automobile, the body and motor of which are omitted for clearness of illustration.
Fig. 2 is a fragmental side elevation viewed from line $x^2$—$x^2$, Fig. 1. Parts are in position to propel the car rearwardly at slow speed. Dotted lines indicate the normal or locked position of the operating lever.
Fig. 3 is a fragmental sectional elevation viewed from $x^3$—$x^3$, Figs. 1 and 2, the parts being in the position shown in Fig. 1, and dotted in Fig. 2. Dotted lines indicate the two operating positions of the lever handle.

Referring to Figs. 1, 2 and 3, the means shown in the drawings consist of connecting rods 108 and 109 pivoted at one end to arms 110 and 111 respectively, the rod 108 being pivoted at the other end to an arm 112 fixed on operating shaft 113, and the rod 109 being pivoted to an arm 114 of a sleeve 115 mounted on the operating shaft 113. An ordinary hinged controlling lever 116 working in an H-slotted sector 117 has the usual engaging pin 118 which engages with an arm 119 of the sleeve 115 or with an arm 120 of the operating shaft 113 as the lever is swung to one or the other side of the neutral position. When the lever 116 is in neutral position shown in dotted lines in Fig. 2 the gears are in the neutral position shown in solid lines in Fig. 4. From this position the lever 116 may be swung into the limb 122 of the H-slot, thus engaging the arm 120, and then by swinging the lever 116 and said engaging arm 120 backward the shaft 113 is rotated, thus moving the arm 112 and the arm 110 of the segment 74 forward, thus moving the segment 74 upward and backward, thus rotating the low speed shifting sleeve 53 to move the leg 60 of the slot $g$ to engagement with the tongues 62 in Fig. 10, thus sliding said tongue backward along the slot 73 and thereby moving the key 68 and the low speed pinion 24 backward to bring the low speed pinion into mesh with the gear $a$ for low speed forward drive. By returning the lever 116 to the middle of the H slot the low speed pinion 24 is again drawn out of mesh and the pinions are again in neutral position shown in Fig. 4. To shift from neutral to second speed the lever 116 will be swung sidewise to engage the arm 119 of the sleeve 115 and then the lever will be moved backward from the dotted position in Fig. 2, thus moving the arm 114, the connecting rod 109, and segment arm 111 forward, and thereby moving the segment 79 upward and rotating the shifting sleeve 54 so as to bring the oblique legs 88 of the slot $h$ into engagement with the shift pins 93, thus shifting collar 92 and the key 98 of the second speed pinion 25 to mesh said pinion with the second speed gear $b$. To shift from second speed to high speed the lever 116 will be thrown directly from limb 123 forward into limb 124 of the H slot. As the lever moves forward from limb 123 toward neutral position the segment 79 will be turned into neutral position shown in Fig. 10 by an operation reverse to that just above described, thereby withdrawing the second speed pinion from mesh. As the lever 116 moves forward from neutral position into the limb 124 of the H slot the shifting sleeve 54 will be further rotated to bring the oblique leg 91 of the slot $i$ into engagement with the shift pin 95 of the collar 94, thus moving said collar, the key 97 and the high speed pinion 26 back until the high speed pinion 26 is in mesh with the high speed gear $c$. When the sleeve 54 is rotated from neutral position shown in Fig. 10 to bring the oblique limb 88 of the slot $h$ into engagement, the straight limb 90 of the slot $i$ will be neutral relative to the shift pin 95; and so, on reverse movement while the bent limb 91 is acting on the shift pin 95 the straight limb 89 of the slot $h$ is neutral relative to the tongue 93. When the lever 116 is again thrown back to neutral position the operation just described is reversed, and the pinions and gears are again in the position indicated in Fig. 4. To shift from low speed forward drive to low speed rearward drive the lever 116 will be pushed directly forward from the limb 122 into the limb 121. On the forward movement of lever 116 from the rear end of the limb 122 of the H slot the low speed pinion 24 is first shifted out of mesh with the gear face $a$ and is then shifted back into meshing position through the operation of the slot legs 60 and 61 on the shift pins 62. See Fig. 10. As the sleeve 53 is rotated while the leg 61 is moving the shift pin 62, the cam 85 moves in the direction indicated by the large arrow in Figs. 6 and 11, and will move the arm 82 to the right in those views, and in Fig. 7, thus operating the segment 45, the pinion 44, crank shaft 40, arm 36 and driven shaft 2, thus shifting the disks 22, 23 to the left in Fig. 4 so that the low speed pinion 24 and the low speed reverse gear $d$ will be brought into mesh as shown in Fig. 5.

To reverse the car from any speed forward drive, the lever will first be brought to neutral and then swung into, and forward to the end of, said limb 121, thus shifting the drive disks 22 and 23 from the position shown in Fig. 4 to that shown in Fig. 5, and also moving the low gear into mesh.

The housing 52 is provided with an annular shoulder 125 and said shoulder and the cap 51 project from the body of the housing 52 to support the shifting sleeves 53, 54, against end thrust; and the sleeves are journaled on said body of the housing 52 directly and on the driving shaft 1 indirectly through the medium of said housing. The housing is rigidly fixed to the gear case 49 and the slots 73 in the housing form longitudinal ways extending alongside the driving shaft so that the revolution of the sleeves operates the shift pins and collars as described.

Anti-friction bearings 127, 128, are provided to maintain the driving shaft 1 in true relation to the housing and gear case. The driven shaft 2 is journaled in the gear case 49 by anti-friction bearings 129 and anti-friction bearings 130 are arranged between the driven shaft shifting sleeve 20 and the gear disk 23 in order to bear the thrust resulting from the action of the pinions on the forward gears *a, b, c*.

The construction of the various parts may be varied from that shown without departing from the spirit of this invention and I do not limit the invention to the specific construction of parts shown as various equivalents thereof may be substituted by the constructor.

I claim:—

1. The combination with a driving shaft, of a low speed bevel pinion and other beveled pinions longitudinally slidable on said shaft, a driven shaft, disks mounted on the driven shaft, and provided with gear faces, means for moving the low speed gear into position to mesh with gear faces on said disks, a sleeve loosely mounted upon said driven shaft and contacting said disks, means engaging said sleeve and bodily shifting said disks simultaneously, with means for moving said low speed pinion, and means for shifting the other pinions into and out of mesh with gear faces on one of said disks.

2. In a variable speed transmission mechanism, the combination of a driving shaft, a driven shaft, disks provided with gear faces and secured to said driven shaft for transmitting power thereto, pinions mounted on said driving shaft and in operable relation to said disks, shifting sleeves journaled on the driving shaft, and means operable by rotation of the shifting sleeves to throw said pinions into and out of engagement with the gears of said disks, and means to rotate said shifting sleeves.

3. In a variable speed gear transmission mechanism, the combination with a housing having longitudinal slots, of a driving and a driven shaft, gears on the driven shaft, pinions on the driving shaft and in operable relation to the gears for transmitting power thereto, shifting sleeves journaled on the driving shaft and provided in their sides with slots, shifting collars mounted in said shifting sleeves and provided with shift pins engaging said slots, and means for rotating the sleeves to move said shifting collars forward or backward upon said driving shaft to throw into and out of engagement said driving gears with said disks upon said driven shaft.

4. The combination with a shiftable gear, of a driving shaft, a driving pinion slidable on the driving shaft, a sleeve journaled on the driving shaft and connected to shift the driving pinion along the driving shaft for engagement with and disengagement from the gear, two cams on the sleeve, a rock shaft, an arm on the rock shaft provided with two rollers for engagement with the cams, a segment on the rock shaft, a crank shaft, a pinion mounted on the crank shaft and meshing with the segment, and means between the crank shaft and gear to shift the gear as the crank shaft is turned by the pinion.

5. In a speed changing mechanism, the combination of concentric gear faces, a driving shaft in radial arrangement to said gear faces, pinions slidably mounted on said shaft and adapted to engage said gear faces, keys mounted to slide along the shaft and adapted to shift the pinions, collars mounted on the shaft and adapted to shift the keys, and sleeves rotatably mounted on the shaft and arranged to shift the collars and provided with gears, and segments to operate said gears to rotate the sleeves for the purpose of shifting the collars.

6. In a speed changing mechanism, the combination with an operating lever, of a pivoted segment connected with the lever, a shaft, a pinion slidably mounted on the shaft, a key for shifting the pinion, a sleeve mounted to rotate on the shaft and provided with a gear for engagement with the segment and also provided with an oblique slot, a housing provided with a longitudinal slot, a collar carried by the shaft and adapted to operate the key and provided with pins operable by the slots to shift the key along the shaft when the sleeve is rotated.

7. In a speed transmission mechanism the combination with a driven shaft, of an internally notched ratchet collar screw-threaded and slotted at one end, an externally pocketed drum mounted on the shaft, said ratchet notches in said collar being arranged in two sets in planes normal to the axis of rotation, the notches of one set being reverse to the notches of the other set, balls in the pockets, means to shift the shaft and drum endwise to move the balls from the notches of one set to the notches of the other set and springs to move the balls toward the notches.

8. In a speed transmission mechanism the combination with a driven shaft, of an internally notched ratchet collar screw-threaded and slotted at one end, an externally pocketed drum mounted on the shaft inside the collar, the ratchet notches in said collar being arranged in two intercommunicating sets that are in two planes normal to the axis of rotation, the notches of one set being reverse to the notches of the other set, balls in the pockets and means to shift the shaft and drum endwise to move the balls from the notches of one set to the notches of the other set, a transmission shaft provided with a flange and with tongues extending into the slots of said collar and a lock-nut screwed into the collar.

9. In a speed transmission mechanism the combination with a driven shaft, of internally notched ratchet collars screw-threaded and slotted at one end, externally pocketed drums mounted on the driven shaft within the collars, the ratchet notches in each of said collars being arranged in two sets that are in two planes, the notches of one set being reverse to the notches of the other set; balls in the pockets, means to shift the shaft and drums endwise to move the balls from the notches of one plane to the notches of the other plane, transmission shafts connected with the collars, disks fastened to the driven shaft and provided with gear faces, a driving shaft, a pinion slidably mounted on the driving shaft; means to shift the pinion along the driving shaft into and out of position to mesh with the gear faces and means to shift the gear faces into and out of mesh with the pinion.

10. The combination with a gear, of a driven shaft connected with the gear, a driving shaft provided with a key-way, a pinion slidably mounted on the driving shaft, a key in the key-way and connected with the pinion, a collar journaled on the driving shaft to keep and move the key along the key-way, and means to move the collar along the shaft.

11. The combination with a gear face, of a driven shaft connected with the gear face, a driving shaft provided with a key-way, a pinion slidably mounted on the driving shaft, a key in the key-way and connected with the pinion, a collar journaled on the driving shaft to keep and more the key along the key-way, said collar being provided with tongues, a sleeve rotatably mounted on the shaft and provided with a bent slot, and means to rotate the sleeve on the shaft to move the collars along the shaft.

12. The combination with an axially shiftable driven shaft, of gears carried by said shaft, a crank shaft connected to shift the driven shaft endwise, a driving shaft, pinions slidably mounted on the driving shaft to drive the gears, sleeves journaled about the driving shaft and connected to shift the pinions along the shaft, cams mounted upon one of said sleeves, a pinion mounted upon the crank shaft, a rock shaft, a segment on the rock shaft to drive the crank shaft pinion, and an arm on the rock shaft provided with rollers to engage the cam.

13. In a speed transmission mechanism the combination with a driven shaft, of a driving shaft, pinions on the driving shaft, gears on the driven shaft, means to shift the gears toward and from the driving shaft for the purpose of moving the gears and pinions into and out of mesh, sleeves on the driving shaft, an H-slotted sector, a lever in said sector, means adapted to be engaged by the lever to rotate the sleeves respectively, means between the sleeves and the pinions for shifting the pinions, and means between the sleeves and the gear shifting means whereby the operation of the lever in said sector may simultaneously shift a pinion and the gears.

14. In a speed transmission mechanism, the combination with a shaft, of collars journaled on the shaft and provided with pins, thrust bearings on the shaft to hold the collars, sleeves provided with slots engaging the pins to operate the collars, guides to guide the pins along the shaft, pinions on the shaft, said shaft being provided with key-ways and keys in the key-ways connecting the collars with the pinions respectively.

15. In a speed transmission mechanism, the combination with a shaft, of a sleeve provided with V-shaped slots, a housing around the shaft provided with slots extending along the shaft, collars journaled on the shaft and provided with pins extending into the slots of the sleeve and housing, and means to rotate the sleeves to move the collars along the shaft.

16. In a speed transmission mechanism, the combination with a shaft, of a sleeve provided with slots having oblique legs, a housing around the shaft with slots extending along the shaft, collars journaled on the shaft and provided with pins extending into the slots of the sleeve and housing, and means to rotate the sleeve to move the collars along the shaft.

17. In a variable speed transmission mechanism, the combination with transmission disks provided with gears, of a shaft, pinions on the shaft, and shifting keys and other elements on the shaft whereby low speed, second speed and high speed pinions are shifted into and out of position to mesh with low speed, second speed and high speed gears on the transmission disks.

18. The combination with a driven shaft, of shiftable gears to drive such shaft, means to shift the gears, a driving shaft, pinions shiftable on the shaft and means on the shaft to shift the pinions.

19. The combination with a driven shaft, of shiftable gears to drive such shaft, means to shift the gears, a driving shaft, pinions shiftable on the shaft and means on the shaft connected to shift the pinions and means connected with said connected means to shift the gears simultaneously with the pinions.

20. The combination with a longitudinally grooved shaft, of pinions on the shaft, keys in the grooves and connected to move the pinions, respectively along the shaft, collars journaled on the shaft and provided with pins, thrust bearings to prevent the collars from sliding along the shaft, a guide extending along the shaft to guide the pins along the shaft, two sleeves on the shaft, one of said sleeves being provided with V-shaped slots for the pins of one collar, and the other sleeve being provided with reversely arranged slots for the pins of other collars, the pins of one of said other collars being in slots that are bent in one direction, and the pins of the other collar being in slots that are bent in the other direction, substantially as and for the purpose set forth.

In testimony whereof, I have hereunto set my hand at Los Angeles, California this 14th day of May 1910.

SAMUEL C. CARTER.

In presence of—
JAMES R. TOWNSEND,
L. BELLE RICE.

---

Copies of this patent may be obtained for five cents each, by addressing the "Commissioner of Patents, Washington, D. C."